United States Patent
Kaya et al.

(10) Patent No.: US 11,797,828 B2
(45) Date of Patent: Oct. 24, 2023

(54) BEAMS TO MONITOR

(71) Applicant: NOKIA SOLUTIONS AND NETWORKS OY, Espoo (FI)

(72) Inventors: Aliye Kaya, Chatham, NJ (US); Michal Maternia, Wroclaw (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 116 days.

(21) Appl. No.: 17/498,060

(22) Filed: Oct. 11, 2021

(65) Prior Publication Data

US 2022/0114423 A1    Apr. 14, 2022

(30) Foreign Application Priority Data

Oct. 9, 2020   (FI) ...................................... 20205994

(51) Int. Cl.
*G06N 3/08*      (2023.01)
*G06N 3/047*     (2023.01)
(Continued)

(52) U.S. Cl.
CPC ............. *G06N 3/047* (2023.01); *G06N 3/08* (2013.01); *H04B 7/0617* (2013.01); *H04B 17/3913* (2015.01)

(58) Field of Classification Search
CPC .......... G06N 3/047; G06N 3/08; G06N 20/00; H04B 7/0617; H04B 17/3913;
(Continued)

(56) References Cited

U.S. PATENT DOCUMENTS

2019/0045414 A1   2/2019   Guerreiro et al.
2019/0052341 A1   2/2019   Furuskog et al.
(Continued)

FOREIGN PATENT DOCUMENTS

WO   2019/029802 A1   2/2019
WO   2019/125255 A1   6/2019
WO   2019/172813 A1   9/2019

OTHER PUBLICATIONS

Office Action dated May 24, 2021 corresponding to Finnish Patent Application No. 20205994, with Finnish Search Report.
(Continued)

*Primary Examiner* — Juan A Torres
(74) *Attorney, Agent, or Firm* — SQUIRE PATTON BOGGS (US) LLP (57) ABSTRACT

To configure a set of user devices, which comprises one or more user devices, to monitor a subset of beams, at least one past beam sequence indicating one or more beams, which served the set is determined, and inputted to a trained model which outputs a probability distribution. Then as many beams as is a number of beams determined for the set to monitor is selected from the probability distribution according to a first criteria, and the set of user devices is configured to monitor and report beams in the beam group. Past beam sequences are also used in training. From the past sequences, set-specifically, past beams that served a set within a first time interval are determined to be used as training data, and future beams that served the set within a second time interval following the first time interval are determined to be used as validation data.

20 Claims, 4 Drawing Sheets

(51) Int. Cl.
  *H04B 17/391* (2015.01)
  *H04B 7/06* (2006.01)
(58) Field of Classification Search
  CPC .... H04B 7/088; H04B 7/0695; H04B 17/373; H04W 16/22; H04W 24/10; H04W 72/046; H04W 16/28; H04W 24/08; H04W 36/0083; H04W 36/305; H04W 72/563; H04L 43/00
  USPC ........................................................ 455/296
  See application file for complete search history.

(56) References Cited

U.S. PATENT DOCUMENTS

2020/0186227 A1* 6/2020 Reider ................. H04B 7/0695
2020/0358514 A1* 11/2020 Landis ................... G06N 3/088
2020/0413316 A1* 12/2020 Isaksson ............... H04W 36/30
2021/0105057 A1* 4/2021 Lundborg ............ H04B 7/0617

OTHER PUBLICATIONS

S. Chen et al., "Time-Sequence Channel Inference for Beam Alignment in Vehicular Networks," In: 2018 IEEE Global Conference on Signal and Information Processing (GlobalSIP), Anaheim, CA, USA, Nov. 2018, pp. 1199-1203.

T. Bai et al., "Analysis of RSRP Prediction in Millimeter Wave Systems," In: 53rd Asilomar Conference on Signals, Systems, and Computers, Pacific Grove, CA, USA, Nov. 2019.

Communication of Acceptance—section 29 a of Patents Decree dated Oct. 4, 2022 corresponding to Finnish Patent Application No. 20205994.

Extended European Search Report dated Mar. 18, 2022 corresponding to European Patent Application No. 21201617.4.

* cited by examiner

BEAMS TO MONITOR

TECHNICAL FIELD

Various example embodiments relate to wireless communications and, particularly, to beam monitoring.

BACKGROUND

Wireless communication systems are under constant development. For example, beamforming may be used to compensate for high path loss rates thereby increasing capacity and coverage. Beamforming is a communication technique in which a transmitter transmits a directional transmission beam towards a receiver.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising at least one processor; and at least one memory including computer program code, the at least one memory and computer program code configured to, with the at least one processor, cause the apparatus at least to perform: determining, for a set of user devices, at least one past beam sequence indicating one or more beams, which served the set of user devices, wherein the set of user devices comprises one or more user devices; inputting the at least one past beam sequence to a trained model which outputs a probability distribution; determining the number of beams the set of user devices is to monitor; determining a beam group for the set of user devices by selecting from the probability distribution according to a first criteria as many beams as is the number of beams; configuring the set of user devices to monitor and report beams in the beam group.

In an embodiment, the at least one memory and computer program code configured to, with the at least one processor, cause the apparatus to input as the past beam sequence at least beam indexes of the past beams.

In an embodiment, the first criteria is to select the beams according to the probability order.

In an embodiment, the at least one memory and computer program code configured to, with the at least one processor, cause the apparatus to, when the probability distribution is a matrix, perform the following to determine the beam group: concatenating the outputs of the matrix to a first vector; defining a second vector having beam indexes repeated so that the length of the second vector equals to the first vector; sorting the first vector in a descending order; shuffling the second vector correspondingly to the sorting, the result being a third vector; eliminating repetitions from the third vector; and selecting from the third vector, starting from the beginning, to the beam group as many beam indexes as is the number of beams the set of user devices is to monitor.

In an embodiment, the at least one memory and computer program code configured to, with the at least one processor, cause the apparatus to determine the number of beams the set of user devices is to monitor at least based on user device capabilities and capabilities of the apparatus.

In an embodiment, the at least one memory and computer program code configured to, with the at least one processor, cause the apparatus to determine a length of the past beam sequence based on user device mobility characteristics and/or based on channel characteristics and/or based on beam widths.

In an embodiment, the at least one memory and computer program code configured to, with the at least one processor, cause the apparatus to store received reports comprising beam measurement results.

In an embodiment, the at least one memory and computer program code configured to, with the at least one processor, cause the apparatus to train the trained model by performing: determining, from past beam measurement reports, set-specifically for sets of user devices, past beams that served a set of user device within a first time interval, and future beams that served the set of user device within a second time interval following the first time interval; determining from the future beams a non-repetitive set of future beams, wherein the non-repetitive set comprises a beam only once; and using the past beams as training data and corresponding non-repetitive sets as validation data.

According to an aspect there is provided an apparatus comprising at least one processor; and at least one memory including computer program code, the at least one memory and computer program code configured to, with the at least one processor, cause the apparatus at least to perform: determining, from past beam measurement reports, set-specifically for sets of user devices, past beams that served a set of user device within a first time interval, and future beams that served the set of user device within a second time interval following the first time interval, wherein a set of user devices comprises one or more user devices; determining from the future beams a non-repetitive set of future beams, wherein the non-repetitive set comprises a beam only once; and using the past beams as training data and corresponding non-repetitive sets as validation data to train a model which outputs a probability distribution of future beams.

In an embodiment, the model is based on a convolutional neural network and is configured to output the probability distribution in a form of a matrix.

According to an aspect there is provided a method comprising: determining, for a set of user devices, at least one past beam sequence indicating one or more beams, which served the set of user devices, wherein the set of user devices comprises one or more user devices; inputting the at least one past beam sequence to a trained model which outputs a probability distribution; determining the number of beams the set of user devices is to monitor; determining a beam group for the set of user devices by selecting from the probability distribution according to a first criteria as many beams as is the number of beams; configuring the set of user devices to monitor and report beams in the beam group.

According to an aspect there is provided a method comprising: determining, from past beam measurement reports, set-specifically for sets of user devices, past beams that served a set of user device within a first time interval, and future beams that served the set of user device within a second time interval following the first time interval, wherein a set of user devices comprises one or more user devices; determining from the future beams a non-repetitive set of future beams, wherein the non-repetitive set comprises a beam only once; and using the past beams as training data and corresponding non-repetitive sets as validation data to train a model which outputs a probability distribution of future beams.

According to an aspect there is provided a computer program comprising instructions for causing an apparatus to perform at least one of a first process and a second process, wherein the first process comprises the following: determining, for a set of user devices, at least one past beam sequence indicating one or more beams, which served the set of user devices, wherein the set of user devices comprises one or more user devices; inputting the at least one past beam sequence to a trained model which outputs a probability distribution; determining the number of beams the set of user devices is to monitor; determining a beam group for the set of user devices by selecting from the probability distribution according to a first criteria as many beams as is the number of beams; configuring the set of user devices to monitor and report beams in the beam group; and wherein the second process comprises the following: determining, from past beam measurement reports, set-specifically for sets of user devices, past beams that served a set of user device within a first time interval, and future beams that served the set of user device within a second time interval following the first time interval; determining from the future beams a non-repetitive set of future beams, wherein the non-repetitive set comprises a beam only once; and using the past beams as training data and corresponding non-repetitive sets as validation data to train a model which outputs a probability distribution of future beams.

According to an aspect there is provided a computer readable medium comprising program instructions for causing an apparatus to perform at least one of a first process and a second process: wherein the first process comprises the following: determining, for a set of user devices, at least one past beam sequence indicating one or more beams, which served the set of user devices, wherein the set of user devices comprises one or more user devices; inputting the at least one past beam sequence to a trained model which outputs a probability distribution; determining the number of beams the set of user devices is to monitor; determining a beam group for the set of user devices by selecting from the probability distribution according to a first criteria as many beams as is the number of beams; configuring the set of user devices to monitor and report beams in the beam group; and wherein the second process comprises the following: determining, from past beam measurement reports, set-specifically for sets of user devices, past beams that served a set of user device within a first time interval, and future beams that served the set of user device within a second time interval following the first time interval; determining from the future beams a non-repetitive set of future beams, wherein the non-repetitive set comprises a beam only once; and using the past beams as training data and corresponding non-repetitive sets as validation data to train a model which outputs a probability distribution of future beams.

In an embodiment, the computer readable medium is a non-transitory computer readable medium.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
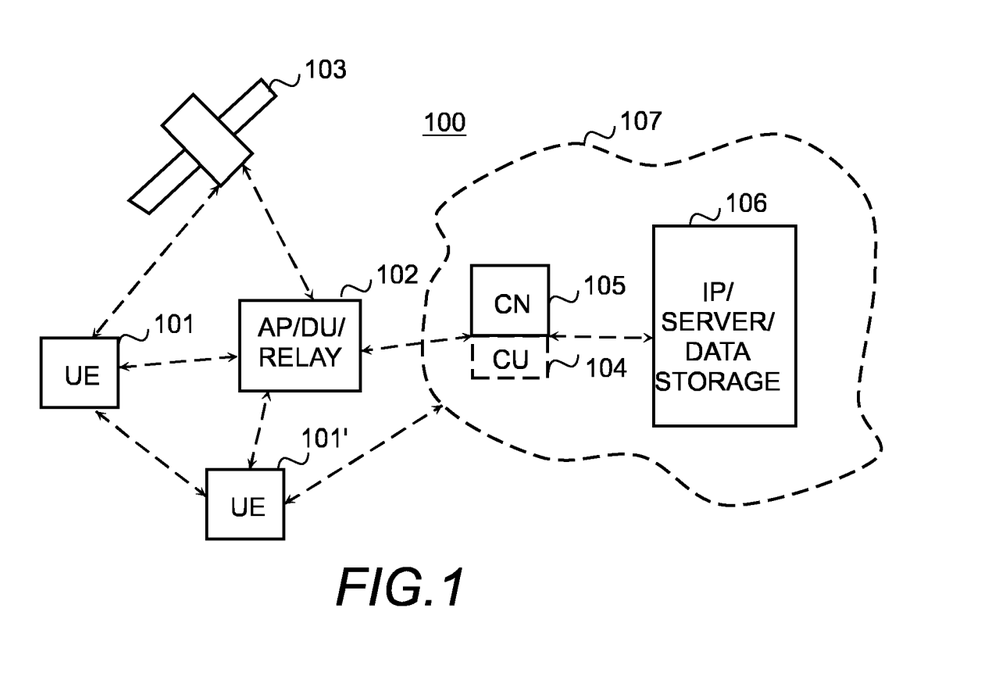
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB)

102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or a server and/or data storage 106 thereof, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In 5G (or new radio, NR) networks cells may be provided by access nodes (base stations), which comprise multiple antenna elements (transmission reception units), and thereby can form multiple beams. Devices served in such cells may provide additional beamforming at their end.

Below term "gNB" is used for access nodes and term "user device" is used for devices/apparatus served by gNB for the sake of clarity, without restricting the examples to gNB and user device. It should be appreciated that the term user device also includes a user device group, the user devices belonging to the user device group being treated as one user device by gNB or are locating in close proximity of each other, thereby sharing similar channel characteristics since and being served by similar beams. In other words, the term user device means a set of user devices, which set may comprise one or more user devices.

For beam management, a user device may monitor and report to gNB one or more beam-specific reference signals. However, for example, for power consumption reasons and/or because of resource limitations, the user device may be configured by gNB to monitor and report only a subset of beams, or more precisely monitor and report reference signals of the subset of beams, provided by gNB.

Figure 2:
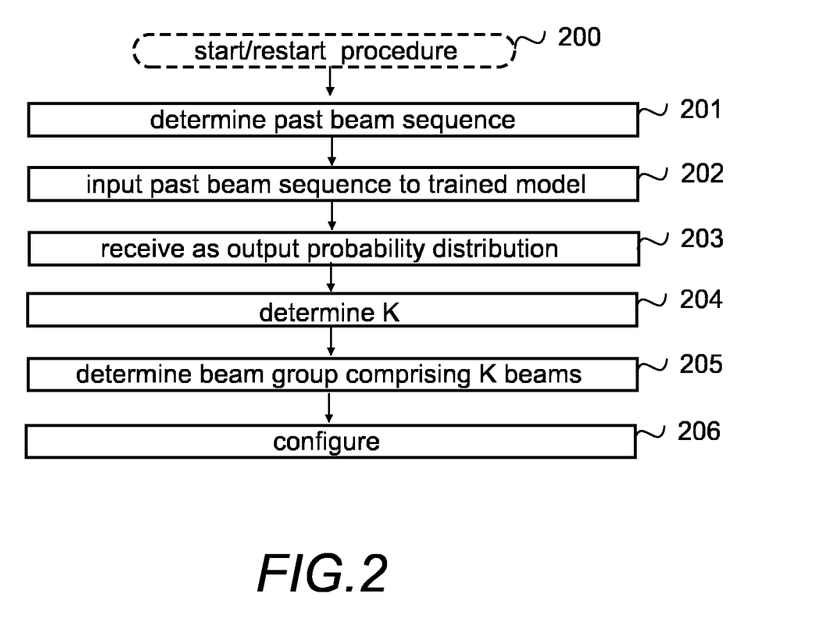
FIG. 2 illustrate an example functionality.

FIG. 2 illustrates an example functionality of gNB when it configures the user device.

Figure 5:
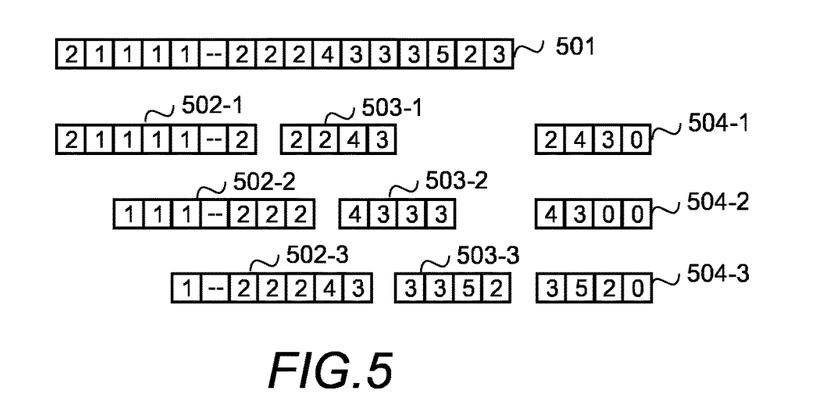
FIG. 5 illustrates examples of different data sets.

Referring to FIG. 2, the configuration procedure is started or restarted in block 200. The starting/restarting may be triggered when the user device changes a serving beam in the same cell or during a handover to another cell or status (mode) of the user device changes to active, for example. Then a past beam sequence is determined in block 201. The past beam sequence is determined using history information on one or more beams that served the user device and it indicates beams that have served the user device. The history information used may also comprise history information on one or more other user devices that have been served by at least one of the one or more beams or by one or more similar beams. For example, the past beam sequence may indicate the one or more beams that served the user device within the last M frames sampled every frame. The criteria described below with block 401 relating to extracting/creating past beam sequences can be used herein as well. The length of the sequence and its scale may be freely determined. The length of the sequence may depend on user device mobility characteristics, for example the speed the user device is moving, and/or on channel characteristics, beam widths used by gNB. For example, sequence 501 in FIG. 5 depicts an example of a past beam sequence comprising beam indexes. In another example, the past beam sequence may comprise 10 beam indexes indicating beams that served the user device with a scale of 10 ms. The past sequence may start with the latest serving beam or end with the latest serving beam.

Once the past beam sequence is determined, it is inputted to a trained model in block 202. The trained model may have been created as described below with FIGS. 4 to 7. The trained model outputs a probability distribution in block 203, which is a matrix of size C×N, wherein C is the number of outputs of the trained model, and N is the number of beams gNB has in total. Each element in the matrix shows the probability of that beam in the set of beams.

Also K, i.e. the number of beams the user device is to monitor, is determined in block 204. The value of K may depend on the number of beams the user device is configured to support and/or the number of beams gNB is configured to support simultaneously in case all N beams cannot be, or are not, used by gNB at the same time and/or it may be a value given by an operator, and/or a value stored to the user device, the stored value possibly being smaller than the number of beams the user device is configured to support. In other words, there may be constraints which need to be met, or at least taken into account, when the number of beams, K, is determined. The user device dependent constraints are signaled to the network during attach procedure, for example. It should be appreciated that usually the number to monitor, K, is much more smaller than the total number of beams provided in the cell, N, and that the number to monitor may be bigger or smaller than the number of outputs of the trained model, C, or equal to the number of outputs of the trained model.

Then a beam group comprising K beams (K unique beam indexes) is determined in block 205 by selecting the K most likely beams from the outputted probability distribution. In other words, the matrix is postprocessed in block 205.

The matrix may be postprocessed for example as follows:
1. Concatenate the C outputs (predictions), for example if C is 4, the concatenated outputs may be expressed as follows: P=[pred1 pred2 pred3 pred4]
2. Define the beam index vector u=[1, 2 . . . N]
3. Define U=[u u u u], wherein U is a vector concatenating the beam index vector C times
4. Sort the concatenated C outputs in P in descending order, for example as P:=P(I), wherein I is a permutation vector.
5. Shuffle U using the permutation vector I used to sort P in descending order: U:=U(I)
6. Eliminate the repetitions in U after shuffling: U:=unique(U)
7. Chose most likely K beams (K<=N) which correspond first K elements of U. For example, first K elements in U may be chosen.

Once the beam group comprising K unique beams is determined in block 205, the user device is configured in block 206 to monitor and report the beams in the beam group. For example, transmission information configuration table, called TCI table, is updated (reconfigured) to have per beam a valid TCI state for reference signals to be monitored and reported, and then sending the updated TCI table to the user device is caused.

In another embodiment, it is checked whether the TCI table before the procedure is started is the same as the TCI table after the procedure, and if they are the same, block 206 may be omitted.

In an example, in which a sequence ends with the latest serving beam, the result of block 201 can be 1 1 2 2 3 3 3 4 4 4, and if K=4, K most likely beams could be 4, 5, 7 and 10 (result of block 205).

The above functionality of FIG. 2 may be implemented to determine cluster based beam groups, i.e. beams serving a cluster of user devices, by performing blocks 201 to 203 per user device, after which the output matrices are aggregated, K is determined based on gNB capabilities and/or user device capabilities and/or constraints, as explained above, and in block 205 from the aggregated output matrices a beam group comprising K beams is determined.

Figure 3:
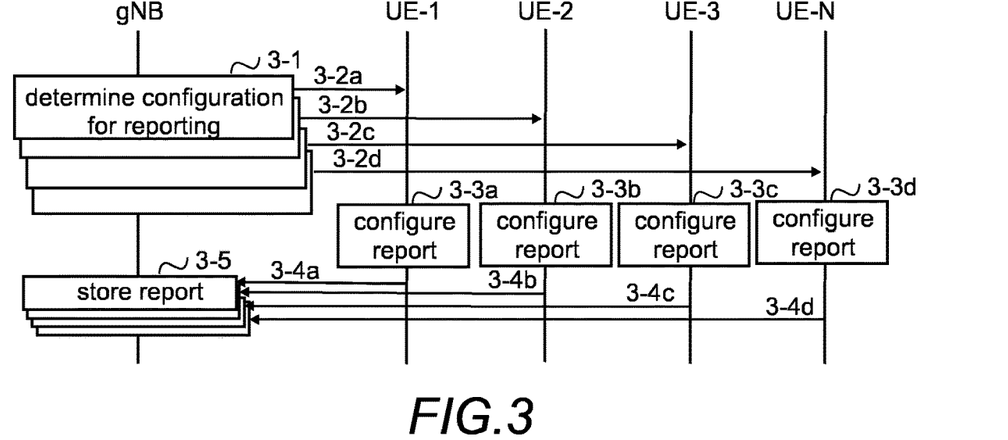
FIG. 3 illustrates an example of information exchange and functionalities.

FIG. 3 illustrates an example of information exchange and functionalities between gNB and served user devices, depicted by UE-1, UE-2, UE-3, UE-N.

Referring to FIG. 3, gNB determines in block 3-1 user device-specifically configuration for reference signal reporting, and causes sending the configurations in messages 3-2a, 3-2b, 3-2c, 3-2d. Messages 3-2a, 3-2b, 3-2c, 3-2d may be layer 3 signalling messages (RRL (radio resource control layer) messages). For example, message 3-2a may request a measurement report for beams 1 and N, message 3-2b periodic measurement reports for beams 1, 32 and 36, message 3-2c periodic measurement reports for a serving beam, and message 3-2d measurement report for the two strongest beam.

When the configuration information is received (messages 3-2a, 3-2b, 3-2c, 3-2d), the user device (UE-1, UE-2, UE-3, UE-N) configures itself correspondingly (block 3-3a, 3-3b, 3-3c, 3-3d), monitors and measures the beams, and sends reports (messages 3-4a, 3-4b, 3-4c, 3-4d) to gNB according to its configuration, until a new configuration is received from gNB. The reports may be sent using layer 2/layer 1 signalling.

When gNB receives a report (message 3-4a, 3-4b, 3-4c, 3-4d) gNB stores (block 3-5) the report to its memory. Naturally it also processes the report to determine whether the user device should change a beam, for example. For example, gNB may store information illustrated in a following table. It should be appreciated that the following table only shows only a small piece of information stored for one user device to illustrate what may be stored, without limiting implementations to the following. In the table, RSRP means a reference signal received power and L1 layer 1.

| UE# | time stamp | Beam 1 L1-RSRP [dBm] | Beam 2 L1-RSRP [dBm] | ... | Beam N L1-RSRP [dBm] |
|---|---|---|---|---|---|
| 1 | 10 ms | −68 | −64 | | −107 |
| 1 | 20 ms | −44 | −60 | | −80 |
| 1 | 52 ms | −110 | | | −85 |
| 1 | 55 ms | −50 | −48 | | |

Naturally, each time gNB determines a new configuration (block 3-1) for a user device, the configuration is sent to the user device, which then configures itself correspondingly.

The information stored in block 3-5 may be used for creating training sets used for obtaining the trained model.

Figure 4:
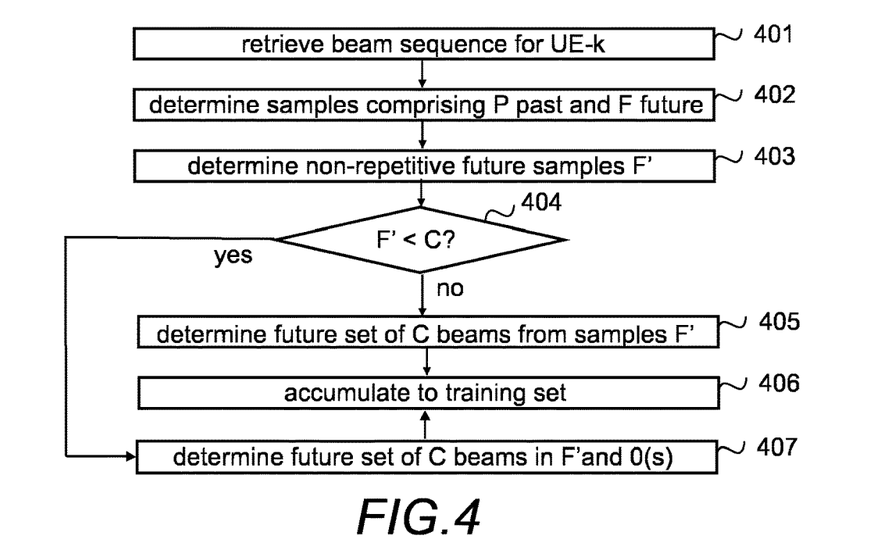
FIG. 4 illustrates an example functionality.

FIG. 4 illustrates an example functionality of an apparatus configured to create training sets using measurement reports from one user device, UE-k, with the help of FIG. 5. The apparatus performing the functionality may be gNB or a cloud server (apparatus), for example.

Referring to FIG. 4, a beam sequence of length L for a user device (UE-k) is retrieved in block 401 from a memory whereto gNB stored measurement report data. In other words, from the memory entries for the user device are extracted so that a beam sequence of L is created unless it already exists in the memory. The beam sequence may be extracted/created using, for example, following criteria: beam index every 10 ms (sampling interval, for example length of a slot), if a dwell time (time spent on a beam) at the best beam at the sampling time t is less than a predetermined time, for example 5 ms, maintain the previous team (beam at sampling time t-1) in the sequence, and if switching power threshold is less than or equal to a predetermined value, for example 3 dB, maintain the previous beam.

Then from the beam sequence 501 one or more samples are determined in block 402 using training data generation criteria. The training data generation criteria may define the number of samples, P, that are to be included into a past sequence of the sample and the number of samples, F, that are to be included into a future sequence of the sample, and a stride between different samples. In the example illustrated in FIG. 5, the stride is 2 slots. The first sample comprises a past sequence 502-1 and a future sequence 503-1. The second sample comprises a past sequence 502-2 and a future sequence 503-2. The third sample comprises a past sequence 502-3 and a future sequence 503-3. Corresponding sample sets can be created until the future sequence comprises the last F samples in the beam sequence 1.

Then from the future sequences F non-repetitive future samples F' are determined in block 403. A non-repetitive future sample F' comprises a beam only once. If beam indexes are used as beam identifiers, a future sequence F may comprise the same beam index once, twice, or more, but a non-repetitive future sample F' comprise a beam index only once.

Then, for each future sample, it is compared in block 404 whether the number of beams, F', in the non-repetitive future sample is less than the number of outputs, C, in the model to be trained. If the number of beams, F', in the non-repetitive future sample is not less than the number of outputs, C, in the model to be trained (block 404: no), then a future set of C beams are determined from the future sequence in block 405. Once determined, the future set and corresponding past sequence are accumulated in block 406 to a training set. If the number of beams, F', in the non-repetitive future sample is less than the number of outputs, C, in the model to be trained (block 404: yes), a future set of beams is determined in block 407 to have the beams in the non-repetitive future sample F' and then zeroes (0) so that the future set comprises C fields. Once determined, the future set and corresponding past sequence are accumulated in block 406 to a training set. Referring to FIG. 5, from the future sequence 503-1 a future set 504-1 is determined in blocks 403 and 407, and sequence 502-1 and the future set 504-1 are accumulated to the training set. Correspondingly, from the future sequence 503-2 a future set 504-2 is determined in blocks 403 and 407, and sequence 502-2 and the future set 504-2 are accumulated to the training set, and from the future sequence 503-3 a future set 504-3 is determined in blocks 403 and 407, and sequence 502-3 and the future set 504-3 are accumulated to the training set.

In another implementation the past sequence and the future sequence are accumulated to the training set, and the future set is determined during training, to be compared with the output.

Figure 6:
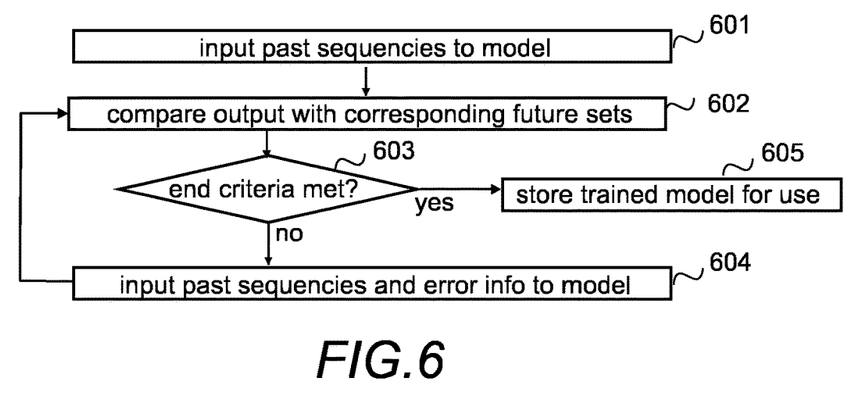
FIG. 6 illustrates an example functionality.
Figure 7:
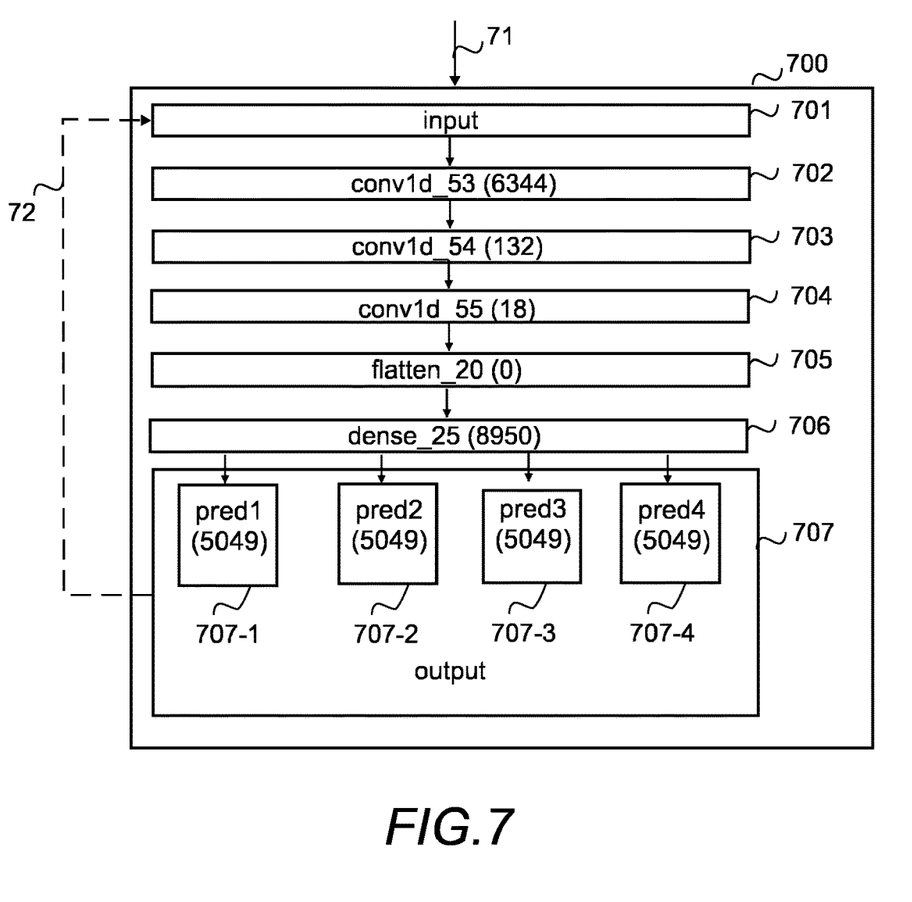
FIG. 7 illustrates a schematic diagram of a trainable model.

FIG. 6 illustrates an example functionality of an apparatus configured to train an artificial intelligent based model to obtain the trained model usable by gNB to obtain probability distribution, to be used for determining configuration information defining which beams amongst multiple beams to monitor, as explained with FIG. 2, for example. The apparatus performing the functionality may be gNB or a cloud server (apparatus), for example. The example functionality describes basic principles used for training and retraining, when need arises, the model. In the example it is assumed that there are enough measurement report data to create training data and validation data. The model to be trained is based on machine learning. A wide range of such algorithms are available and any of them, or any corresponding future algorithms may be used as a basis for the model to be trained. The machine learning may be classification, using an artificial neural network, or a support vector machine, or regression, to name couple of examples. Naturally, any other machine learning, such as image learning, rule-based learning and explanation-based learning, may be used. In FIG. 7 one example of a model is disclosed in detail.

The training may be triggered periodically, and/or in response to detecting a performance degradation and/or in response to configuration changes in gNB.

Referring to FIG. 6, it is assumed that data comprising past sequences and future sets is available, the past sequences being used as training data and the future sets being used as the validation data (ground truth, the correct future set). The training is triggered by inputting in block 601 the past sequences to the model. An initial error, which may be set arbitrarily, may also inputted in block 601. The thus obtained model outputs are compared in block 602 with corresponding future sets. Depending on an implementation of the training algorithm may select from the outputs one or more most likely next beams and compare whether they are the some as corresponding correct one or more beams in the future sets. In other words, a categorical loss function is used. If the comparison indicates that end criteria is not met (block 603: no), the past sequences and error information obtained during comparison is inputted to the model in block 604 to tweak the parameters of the neural network and the process returns to block 602 to compare output with the future sets. To minimize the error, the error information inputted is determined by using a categorical loss function. An end criteria may be that the output is the same as the corresponding future set.

When the model is determined to be accurate, i.e. the end criteria is met (block 603: yes), the trained model is stored in block 605 for use by gNB.

In other words, the machine learning model is trained using the training data in an iterative manner until the model fulfils end criteria (accuracy criteria). The accuracy criteria may be that outputted estimated predictions of conditions should correspond to the predictions of conditions obtained from the remote monitoring analysis. The training may be supervised learning or semi-supervised learning. When the machine learning model is using an artificial neural network, during the iterations weights of nodes in the artificial neural network based model may be adjusted.

FIG. 7 is a block diagram illustrating in a high level an example structure of a trainable artificial intelligence based model. The illustrated model 700 is based on convolutional neural network and comprises an input layer 701, three convolutional layers 702 703, 704, for example convolutional layers convict for processing sequences, a flatten layer 705, a dense layer 706 and an output layer 707 comprising in the illustrated example four outputs 707-1, 707-2, 707-3, 707-4. It should be appreciated that the output layer may comprise any number of outputs.

The input layer 701 does not comprise any parameters, but receives the past sequences as input 71. When the model is trained, the input layer 701 receives during the training iterations also error information input 72. The error information 72 is kind of a loss between the true set (target set) and predicted set (outputted set). Implicitly, during the training the error information input 72 is used to tweak the parameters of the neural network. When the trained model is in use, no error information 72 is inputted.

The input layer forwards its input to the first convolutional layer 702, which in the example comprises 6344 trainable parameters. The output of the first convolutional layer 702 is inputted to the second convolutional layer 703, which in the example comprises 132 trainable parameters. The output of the second convolutional layer 703 is inputted to the third convolutional layer 704, which in the example comprises 18 trainable parameters. The output of the third convolutional layer 704 is inputted to the flatten layer 705, which in the example does not comprise any parameters. The output of the flatten layer 705 is inputted to the dense layer 706, which in the example comprises 8950 trainable parameters. The output of the dense layer is inputted to the outputs 707-1, 707-2, 707-3, 707-4, an output in the output layer comprising 5049 trainable parameters. Then, using the categorical loss function input 72 is created by comparing results obtained from the outputs to validation data (future sets).

Altogether in the illustrated example the model comprises 35 640 trainable parameters and zero non-trainable parameters.

The use of probability distribution, i.e. the simplification, enables use of trained models based on convolutional neural network architectures, which are less complicated and hence easier to implement than trained models based on long short-term memory (LSTM) recurrent neural network architecture. However, in another embodiment the trained model may be based LSTM encoder configured to determine, using the above input (past sequences of beams) and principles, as the probability distribution, beams in future slots, and aggregate beam groups based the beams in future slots.

Although in the above examples the input to the trained model is the past sequences of beams, indicated by beam index values, additional information may be used as part of the past sequence input, also in the training. The additional information may comprise reference signal received power (RSRP) information and/or channel quality information, for example channel quality indicators (CQIs), and/or location(s) of the user device.

It should be appreciated that the above examples can be used for determining, based on the history information, uplink beams or downlink beams or both uplink and downlink beams. Further, history information of downlink beams can be used for predicting K most likely uplink beams, and vice versa. Naturally, history information of downlink beams can be used for predicting K most likely downlink beams, history information of uplink beams can be used for predicting K most likely uplink beams and history information of both uplink and downlink beams can be used to predict K most likely uplink beams and/or K most likely downlink beams, wherein the value of K for uplink may be the same or different than the value of K for downlink. Further, uplink beam(s) serving a user device may be the same, or contain one or more different beams than downlink beam(s) serving the user device.

The blocks, related functions, and information exchanges described above by means of FIGS. 2 to 7 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 8:
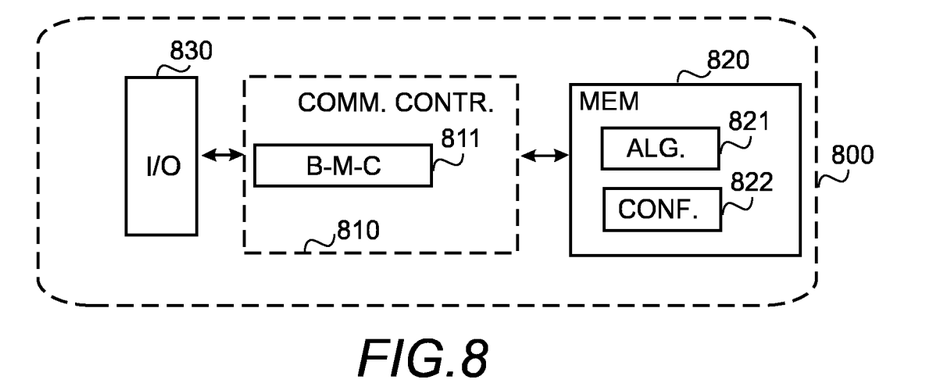
FIGS. 8 and 9 are schematic block diagrams.
Figure 9:
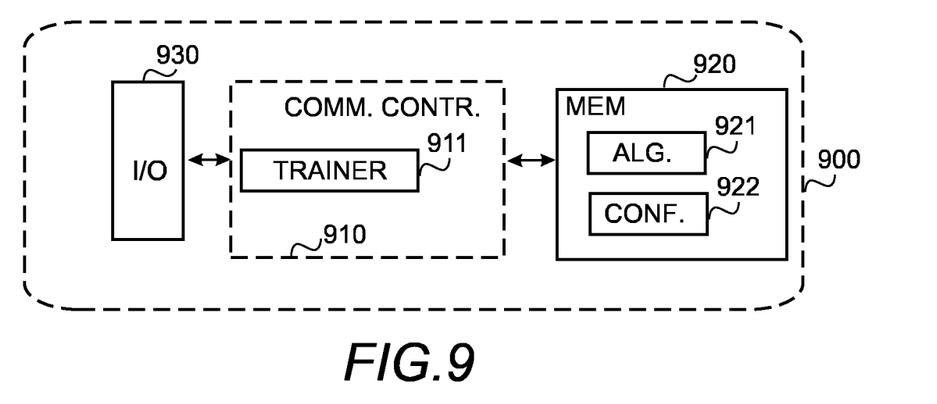

FIGS. 8 and 9 illustrate apparatuses comprising a communication controller 810, 910 such as at least one processor or processing circuitry, and at least one memory 820, 920 including a computer program code (software, algorithm) ALG. 821, 921, wherein the at least one memory and the computer program code (software, algorithm) are configured, with the at least one processor, to cause the respective apparatus to carry out any one of the embodiments, examples and implementations described above. FIG. 8 illustrates an apparatus configured to configure user devices to monitor and report beams, and FIG. 9 illustrates an apparatus for training a model used by the apparatus in FIG. 8. The apparatuses of FIGS. 8 and 9 may be electronic devices. Further, an apparatus may be a combination of the apparatus illustrated in FIG. 8 and the apparatus illustrated in FIG. 9.

Referring to FIGS. 8 and 9, the memory 820, 920 may be implemented using any suitable data storage technology, such as semiconductor based memory devices, flash memory, magnetic memory devices and systems, optical memory devices and systems, fixed memory and removable memory. The memory may comprise a configuration storage CONF. 822,922, such as a configuration database, for at least storing one or more configurations, including beam monitoring configurations at least temporarily. The memory 820 may further store, measurement reports on beams. The memory 820, 920 may further store a data buffer for data waiting to be processed (including transmission).

Referring to FIG. 8, the apparatus, for example gNB, comprises a communication interface 830 comprising hardware and/or software for realizing communication connectivity according to one or more wireless and/or wired communication protocols. The communication interface 830 may provide the apparatus with radio communication capabilities with user devices (terminal devices) camping in one or more cells controlled by the apparatus, as well as communication capabilities towards a wired network.

Digital signal processing regarding transmission and reception of signals may be performed in a communication controller 810. The communication interface may comprise standard well-known components such as an amplifier, filter, frequency-converter, (de)modulator, and encoder/decoder circuitries and one or more antennas.

The communication controller 810 comprises a beam monitoring configuration (B-M-C) processing circuitry 811 configured to configure user devices to monitor and report beams according to any one of the embodiments/examples/implementations described above. The communication controller 810 may control the beam monitoring configuration processing circuitry 811. Digital signal processing regarding transmission and reception of signals, for example configuration messages and reports on beams, may be performed in a communication controller 810.

In an embodiment, at least some of the functionalities of the apparatus of FIG. 8 may be shared between two physically separate devices, forming one operational entity. Therefore, the apparatus may be seen to depict the operational entity comprising one or more physically separate devices for executing at least some of the processes described with respect to the sink node.

Referring to FIG. 9, the apparatus 900 may further comprise a communication interface 930 comprising hardware and/or software for realizing communication connectivity according to one or more communication protocols. The communication interface 930 may provide the apparatus 900 with communication capabilities with the apparatus of FIG. 8. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 910.

The communication controller 910 comprises a trainer circuitry 911 configured to train a model for beam prediction according to any one of the embodiments/examples/implementations described above. The trained circuitry 911 may communicate the trained model and/or updated parameters to the apparatus 800 through the communication interface 930.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples/embodiments according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:
1. An apparatus, comprising:
at least one processor; and
at least one memory including computer program code, the at least one memory and computer program code configured to, with the at least one processor, cause the apparatus at least to perform:
determining, for a set of user devices, at least one past beam sequence indicating one or more beams, which served the set of user devices, wherein the set of user devices comprises one or more user devices;

inputting the at least one past beam sequence to a trained model which outputs a probability distribution among the one or more beams to indicate a probability that each beam serves the set of user devices;
determining a number of beams the set of user devices is to monitor;
determining a beam group for the set of user devices by selecting from the probability distribution of the one or more beams according to a first criteria as many beams as is the number of beams; and
configuring the set of user devices to monitor and report beams in the beam group.

2. The apparatus according to claim 1, wherein the at least one memory and computer program code are further configured to, with the at least one processor, cause the apparatus to input as the past beam sequence at least beam indexes of the past beams.

3. The apparatus according to claim 1, wherein the first criteria is to select the beams according to a probability order.

4. The apparatus according to claim 1, wherein the at least one memory and computer program code are further configured to, with the at least one processor, cause the apparatus to, when the probability distribution is a matrix, perform the following to determine the beam group:
concatenating the outputs of the matrix to a first vector;
defining a second vector having beam indexes repeated so that a length of the second vector equals to the first vector;
sorting the first vector in a descending order;
shuffling the second vector correspondingly to the sorting, a result being a third vector;
eliminating repetitions from the third vector; and
selecting from the third vector, starting from the beginning, to the beam group as many beam indexes as is the number of beams the set of user devices is to monitor.

5. The apparatus according to claim 1, wherein the at least one memory and computer program code are further configured to, with the at least one processor, cause the apparatus to determine the number of beams the set of user devices is to monitor at least based on user device capabilities and capabilities of the apparatus.

6. The apparatus according to claim 1, wherein the at least one memory and computer program code are further configured to, with the at least one processor, cause the apparatus to determine a length of the past beam sequence based on user device mobility characteristics and/or based on channel characteristics and/or based on beam widths.

7. The apparatus according to claim 1, wherein the at least one memory and computer program code are further configured to, with the at least one processor, cause the apparatus to store received reports comprising beam measurement results.

8. The apparatus according to claim 7, wherein the at least one memory and computer program code are further configured to, with the at least one processor, cause the apparatus to train the trained model by performing:
determining, from past beam measurement reports, set-specifically for sets of user devices, past beams that served a set of user device within a first time interval, and future beams that served the set of user device within a second time interval following the first time interval;
determining from the future beams a non-repetitive set of future beams, wherein the non-repetitive set comprises a beam only once; and
using the past beams as training data and corresponding non-repetitive sets as validation data.

9. The apparatus according to claim 1, wherein the model is based on a convolutional neural network and is configured to output the probability distribution in a form of a matrix.

10. An apparatus, comprising:
at least one processor; and
at least one memory including computer program code, the at least one memory and computer program code configured to, with the at least one processor, cause the apparatus at least to perform:
determining, from past beam measurement reports, set specifically for sets of user devices, past beams that served a set of user device within a first time interval, and future beams that served the set of user device within a second time interval following the first time interval, wherein a set of user devices comprises one or more user devices;
determining from the future beams a non-repetitive set of future beams, wherein the non-repetitive set comprises a beam only once; and
using the past beams as training data and corresponding non-repetitive sets as validation data to train a model which outputs a probability distribution of the future beams to indicate a probability that each beam serves the set of user devices.

11. The apparatus according to claim 10, wherein the model is based on a convolutional neural network and is configured to output the probability distribution in a form of a matrix.

12. A method, comprising:
determining, for a set of user devices, at least one past beam sequence indicating one or more beams, which served the set of user devices, wherein the set of user devices comprises one or more user devices;
inputting the at least one past beam sequence to a trained model which outputs a probability distribution among the one or more beams to indicate a probability that each beam serves the set of user devices;
determining a number of beams the set of user devices is to monitor;
determining a beam group for the set of user devices by selecting from the probability distribution of the one or more beams according to a first criteria as many beams as is the number of beams; and
configuring the set of user devices to monitor and report beams in the beam group.

13. The method according to claim 12, further comprising:
inputting as the past beam sequence at least beam indexes of the past beams.

14. The method according to claim 12, wherein the first criteria is to select the beams according to a probability order.

15. The method according to claim 12, the method further comprising:
when the probability distribution is a matrix, perform the following to determine the beam group:
concatenating outputs of the matrix to a first vector;
defining a second vector having beam indexes repeated so that the length of the second vector equals to the first vector;
sorting the first vector in a descending order;
shuffling the second vector correspondingly to the sorting, a result being a third vector;
eliminating repetitions from the third vector; and selecting from the third vector, starting from the beginning, to the beam group as many beam indexes as is the number of beams the set of user devices is to monitor.

16. The method according to claim 12, further comprising:
    determining the number of beams the set of user devices is to monitor at least based on user device capabilities and capabilities of the apparatus.

17. The method according to claim 12, further comprising:
    determining a length of the past beam sequence based on user device mobility characteristics and/or based on channel characteristics and/or based on beam widths.

18. The method according to claim 12, further comprising:
    storing received reports comprising beam measurement results.

19. The method according to claim 18, further comprising:
    training the trained model by performing:
    determining, from past beam measurement reports, set specifically for sets of user devices, past beams that served a set of user device within a first time interval, and future beams that served the set of user device within a second time interval following the first time interval;
    determining from the future beams a non-repetitive set of future beams, wherein the non-repetitive set comprises a beam only once; and
    using the past beams as training data and corresponding non-repetitive sets as validation data.

20. The method according to claim 12, wherein the model is based on a convolutional neural network and is configured to output the probability distribution in a form of a matrix.

* * * * *